United States Patent Office 2,861,296
Patented Nov. 25, 1958

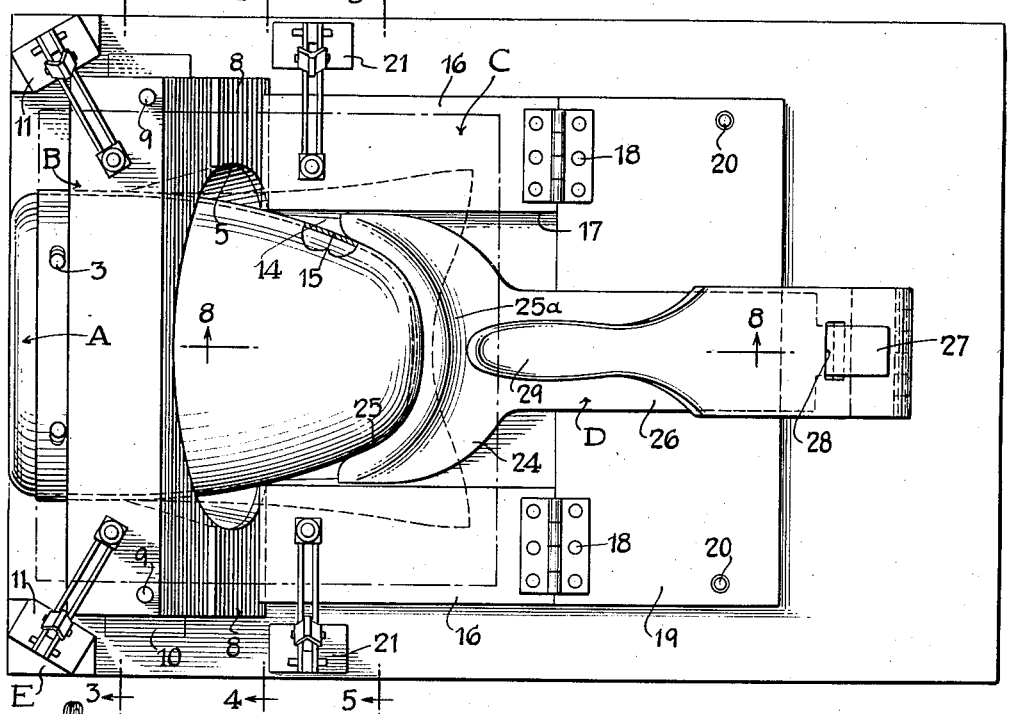
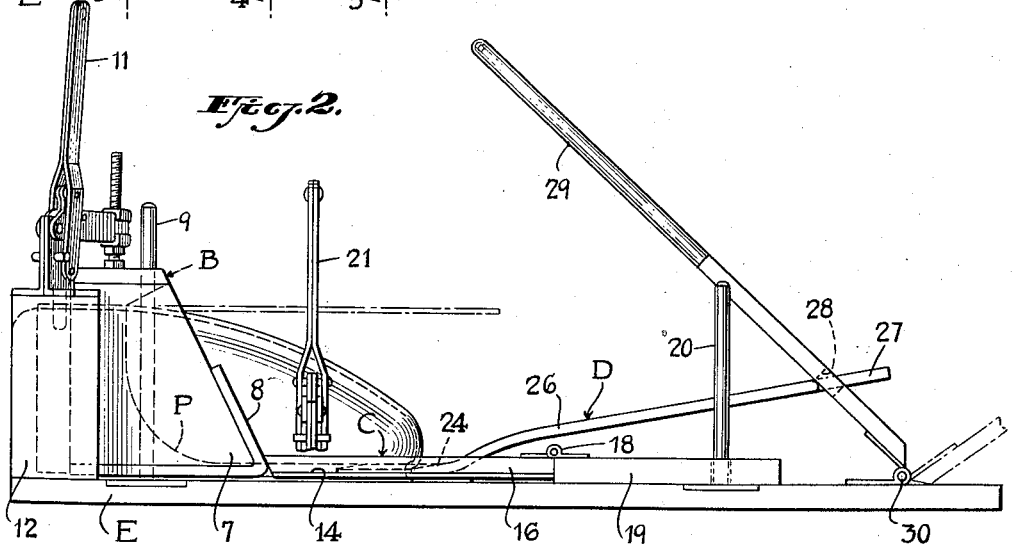

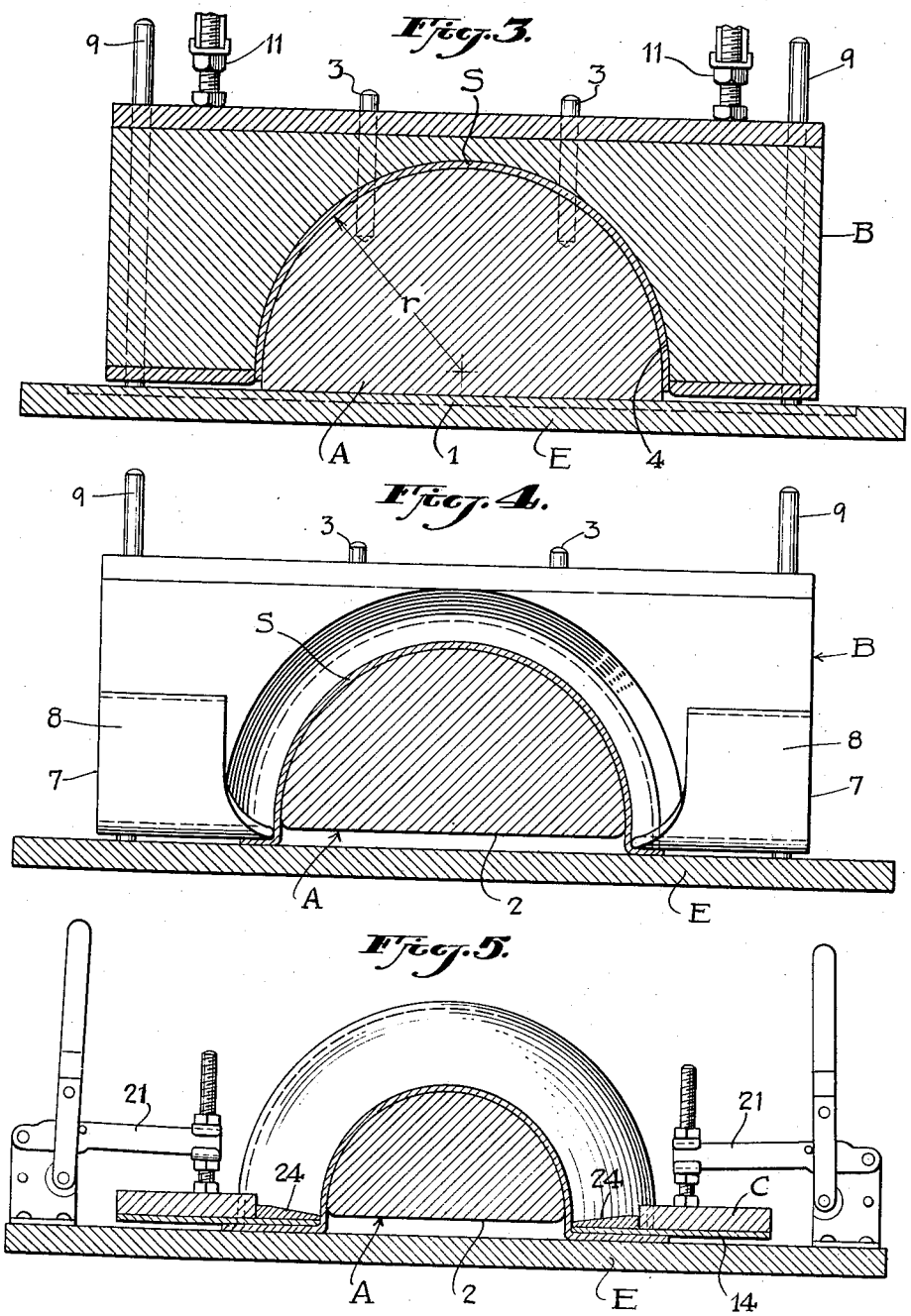

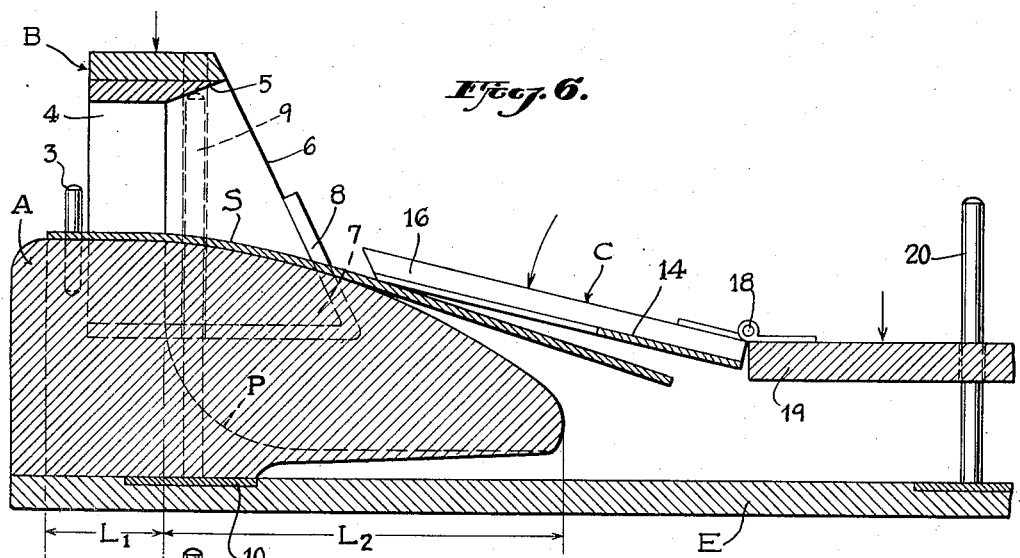
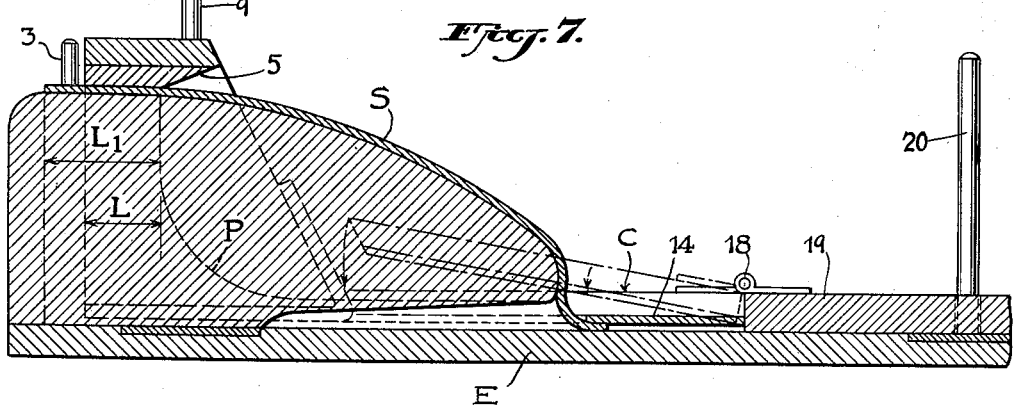
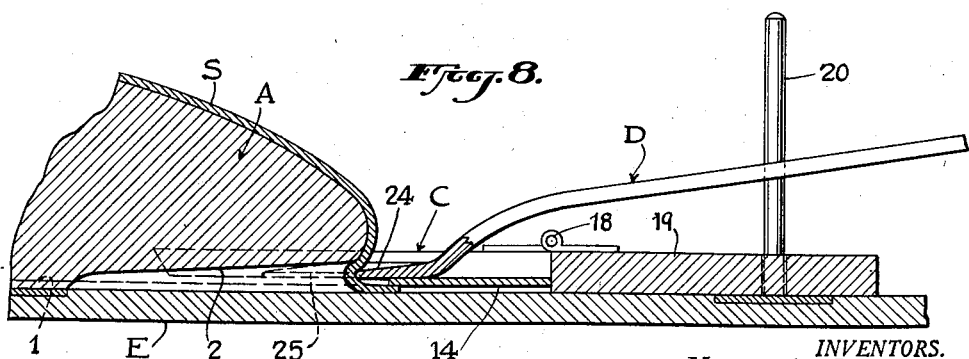

2,861,296

METHOD AND APPARATUS FOR FORMING HOLLOW BODIES OF DOUBLE OR VARIABLE CURVATURE

Verle A. Miller, Albert J. Firth, and Leonard F. Shepard, Dover, Del., assignors to International Latex Corporation, Dover, Del., a corporation of Delaware Application July 1, 1952, Serial No. 296,618

10 Claims. (Cl. 18—19)

This invention relates in general to the art of forming hollow bodies of double or variable curvature from thermoplastic sheet material; and more especially to the art of forming hollow bodies free from substantial optical distortion throughout a major area thereof.

The invention is especially useful for forming face pieces or panels for use in airtight helmets of the character disclosed in Andrews et al. application Serial No. 257,002, filed November 19, 1951. Such face pieces are convex both longitudinally and transversely and taper from a wider end of relatively large radius of curvature, corresponding to the forehead portion to a narrower rounded end of substantially sharper radius of curvature corresponding to the chin portion and, therefore, the hollow body comprises a surface having varying degrees of transverse curvature throughout its length and a longitudinal curvature which varies in a transverse direction. Such face pieces are made of laminated sheet material, such as "Plexiglas," and the formation of such sheet material into a complex curved surface has presented a very great problem, especially since such face pieces must be free of optical distortion, and if the face pieces as molded from the sheet material are optically distorted costly and time consuming grinding and polishing is required. Additionally, it is desired that such face pieces be provided with an electrical resistance grid for heating the panel. For example, such a grid may be formed of nichrome wire of a diameter of the order of 0.003" and the wires must be maintained in parallelism and preferably spaced apart equidistantly to prevent eyestrain or optical distortion. Furthermore, in view of the fineness of these wires it is necessary to prevent undue strains in the portion of the face piece containing the resistance wire grid in order to prevent breakage of the wires as well as their displacement from parallelism.

An object of this invention is to provide improved apparatus and method of forming or molding articles of the character described wherein the articles so molded are free from substantial optical distortion.

Another object of the invention is to provide apparatus which is simple, durable and inexpensive to make.

Another object is to provide a method of molding hollow plastic bodies from sheet material while retaining a substantial surface area of said material free from localized stresses.

Another object is to produce face pieces of the character described containing an electrical resistance wire disposed in parallel grid formation without breaking said wire or distorting said parallelism.

Other features and advantages of the invention will more fully appear from the following description, taken in connection with the drawings, showing the presently preferred apparatus for carrying out the method, in which:

Fig. 1 is a plan view of a preferred form of apparatus in accordance with this invention;

Fig. 2 is a side elevation of the apparatus shown in Fig. 1;

Figs. 3, 4 and 5 are cross-sectional views taken along the lines 3—3, 4—4 and 5—5 respectively of Fig. 1; and Figs. 6, 7 and 8 are partial longitudinal sectional views taken along the longitudinal center line of Fig. 1 showing the position of the parts in various stages of operation.

The apparatus comprises the main units identified and designated in general as follows:

A is a male form whose convex forming surface corresponds to the interior surface of the body to be formed thereon;

B is a female form in the general shape of an arch or saddle which transversely spans the male form A adjacent one end for a limited extent in a longitudinal direction of the male form;

C is a wiping member;

D is a tuck-in member; and

E is a suitable support, such as a base plate, on which the foregoing parts are mounted in operative relationship.

Male form A

The male form A provides the contour desired for the hollow body to be formed or molded. In the instant embodiment this body is a face panel for a helmet having a double curved surface, i. e., a surface which is curved longitudinally and transversely. Such face panels must be free of optical distortion and in order to avoid the necessity of grinding or polishing the surface the form A is made with a surface having almost a glass-like finish. Preferably we employ for this purpose a cast resin form made of material such as Rezolin casting resin which is sufficiently durable and which does not mar the surface of the sheet blank when formed in contact with the male form or mold.

Referring more particularly to Figs. 1, 3 and 6: the form A at its larger, rear, end is provided with a portion extending longitudinally for a distance designated L1 which in cross-section (Fig. 3) is of substantially uniform curvature, such as the surface of a cylinder having a radius $r$ whose center is disposed somewhat above the transversely extending base 1 which is securely fastened to the base plate E. The forward end of the form A gradually tapers throughout the remainder of its length L2 and is curved longitudinally and laterally, terminating in a somewhat rounded small end in plan view. Commencing at the smaller end, which corresponds to the chin portion of the face panel, the form A is undercut rearwardly toward and merges with the base 1 so as to provide a relief recess, for the purposes to be later described. In the present embodiment this undercutting extends entirely beneath the form 1 but it is understood that a groove of suitable depth would be sufficient for the purpose. The top of the undercut recess corresponds in general to the rear edge of the face piece and the forward edge of the cylindrical zone L1 corresponds to the top of the face piece. A pair of locating pins, such as 3, have their lower ends securely anchored in the form A with their upper ends extending vertically upward from the plane of the base plate. The pins 3 are preferably spaced about 7/8" from the rear or outer edge of the cylindrical zone L1 and are spaced apart about 4 7/8" along the arm of the surface, i. e., each about 2 7/16" from the center. In connection with the spacing of these pins, it is noted that when the pins were spaced the distance of the order of 3/4" from the center line the results were unsatisfactory and when moved outwardly a distance of the order of 2" from the center line operative conditions were found to be satisfactory. With the pins spaced at the smaller distance undue stress was noted in the plastic blank being formed and this caused undesirable stresses and undesirable breakage of the resistance wires embedded therein.

It is here noted that the cylindrical zone L1 corresponds to that portion of the blank being formed lying beyond the adjacent end of the face piece, and therefore is trimmed off after the molding or forming is completed. This will be seen from Figs. 6 and 7 in which the broken line P indicates the trim line of the finished face piece. This extended end of the blank which is to be trimmed off is utilized for clamping engagement of the blank being formed, as by means of the female saddle form B now to be described.

Female form B

The female saddle form B (Figs. 3 and 6) is provided with an inner cylindrical surface 4 overlying a portion of the cylindrical zone L1 of the male form A and complementary to the curvature of the male form A, so that the sheet being operated upon may be firmly clamped between the cooperating surfaces of the forms A and B. The inner surface of the saddle form B flares outwardly and forwardly, as at 5 (Figs. 1 and 6), so as to avoid contact with the blank of sheet material being operated upon. The forward face of the saddle form B is inclined downwardly and forwardly, as at 6, and terminates in oppositely disposed legs, such as 7 (Fig. 2), which are preferably provided with metal plates, such as 8. Parallel guide pins, such as 9, have their lower ends fixed in the base plate E, which at this point is preferably reinforced by a plate 10, and extend vertically upwardly through corresponding holes provided in the saddle form B; to thereby permit operative movement of the form B relative to the form A while holding these form members in registered alignment. Suitable means is provided for clamping the female saddle form B in its downward position, such as a pair of clamps 11 which are fixed to the base plate E by means of a pedestal, such as 12. It will be understood that the saddle form B serves to initiate the transverse bending of the sheet blank to be formed by initially bending the blank into a relatively uniform curved surface, and in the later part of its operation serves to firmly clamp the partially formed blank throughout its transverse arcuate extent in the zone L1.

Wiping member C

The wiping member C (Figs. 1 and 6) comprises a wiping plate 14 whose forward edge is provided with a concave recess 15 conforming to the contour of the tapered end of the male form A throughout the extent forwardly of the saddle member B at the maximum diameter of said tapered end in plan view (Fig. 1). The recess portion 15 being of a dimension to extend from the plates 8, around the chin portion of the form A and of a size to provide a space between the concavity 15 and the male form A substantially equal to the thickness of the sheet blank being operated upon; except that at the bottom of the recess there is a somewhat greater clearance. The plate 14 is preferably provided with oppositely disposed thickened strips, such as 16, which may be conveniently made of wood, intimately secured to the upper face of the plate 14 and provided therebetween a guideway 17. The wiping member C is pivotally mounted, as by hinges 18, to a panel 19 which is slidably disposed on vertically extending guide pins, such as 20, rigidly mounted on the base plate E. If desired, the guide pins 20 may be omitted and the panel 19 may be formed as an integral base plate E, as will be more fully pointed out below. In any event the position of the pivot points of the hinges 18 is such that when the wiping member C is disposed in its lowermost position the free edge lies closely adjacent, and preferably in engagement with the inclined plates 8 on the adjacent face of the saddle member B; and the recessed edge of the plate 14 lies in the spaced relation above referred to. Suitable clamping means, such as a pair of oppositely disposed clamps 21, is provided for locking the wiping member C in its lowermost position.

Tuck-in member D

The tuck-in member D (Figs. 1 and 8) is utilized to give the final shape to the chin section and comprises a forward end 24 whose free edge is provided with a recess 25 of generally arcuate shape conforming to the rounded forward end of the form A and slightly smaller than the outline of said form in plan view. This forward end is of a thickness somewhat less than the height of the clearance recess provided by the cut-away 2 and in the present embodiment is made of a plate, such as aluminum, approximately 3/8" in thickness to provide suitable strength and which at the concavity 25 is sharpened, from about the arcuate zone 25a, to an edge about 1/32" in radius disposed closely to the lower surface of the end 24. The tuck-in member D also comprises a forwardly extending body portion 26 whose outer end is provided with a tongue 27 of reduced width received in a slot 28 provided in a hand lever 29 which is pivotally secured at 30 to the base plate E. It will be noted that the free end 24 of the tuck-in member D when in operative position lies in the groove 17 and is disposed on the upper surface of the wiping plate 14, serving to guide the tuck-in member in a plane parallel to the base plate E and generally parallel to the base 1 of the male form A as the tuck-in member is moved forwardly by moving the hand lever 29 in an anti-clockwise direction about its pivot 30.

Before describing the method further details of the sheet material from which the article is preferably formed will be referred to. Sheet material approximately 0.125" thick comprising laminates of suitable transparent plastic material, such for example as polymethyl methacrylate (known under the trade name "Plexiglas" and "Lucite"), vinyl acetate (such as "Vinylite") etc., or a combination of two or more of these materials, has been found suitable. For example, we have found the following specific laminated sheet material to be entirely satisfactory, i. e., a laminated sheet consisting of a three-ply laminate comprising two plies each 1/16" thick Plexiglas and an intermediate Vinylite ply 0.010" containing the heating element made of 0.003" nichrome wire arranged in the required parallel grid pattern. This grid pattern extends over an area of the sheet corresponding to that area of the face piece to be disposed in front of the eyes of the wearer throughout the desired field of vision. It is to be understood that the invention is not limited to bodies made from laminated material or containing heating wires.

Method

A blank of a desired sheet material is selected and for the particular purposes of making face pieces of suitable size this blank will be approximately 12" square. Holes are drilled in the blank to receive the positioning pins 3—3 (Figs. 1 and 6) and in this connection it is noted that we have obtained best results by making these holes slightly elongated in a transverse direction and spaced apart a distance slightly greater than the space between the pins, so that a slight excess of plastic is disposed between the pins at the start of the forming operation.

A sheet blank as above indicated is heated until soft enough to form. Oil heating is preferred to air heating because of the lubrication which is obtained between the plastic and the form, and the lesser tendency toward dust marks on the finished product. As low a temperature of heating as practicable to permit forming is desired so as to prevent distortion of the wired laminate prior to forming. We have found it satisfactory to heat a blank three minutes at 240–245° F.

After the blank is heated as above described and while still coated with oil it is rapidly placed over the positioning pins 3 in the male mold A. The female saddle B is then pushed down over the centering pins 9 into bending or forming engagement with the blank, and shortly after the saddle B commences to bend the sheet in a transverse direction of more or less uniform curvature, a chin wiping member C is moved downwardly, following the saddle B closely so that excess material is pushed out the side before the saddle reaches the lower limit of its movement. This procedure is critical in order to prevent side wrinkles in the product, but becomes less so as the amount of excess sheet plastic to be eliminated is reduced to a minimum by decreasing the form area in front of the zone L, i. e., below the cut-off line defining the upper edge of the piece to be formed. When the saddle B has reached the bottom of its stroke (Fig. 3) it is clamped in position by means of clamps 11 and at that time the opposite edges of the plastic are disposed slightly above the base 1 in the zone L1; and at the somewhat smaller diameter of the form A (Fig. 4) the lower faces of the legs 7 of the saddle B clamp oppositely disposed and outwardly extending marginal edges of the blank firmly against the base plate E. Concurrently with the movement of the saddle B downwardly during the latter part of its stroke the wiping member C is being moved downwardly and it is clamped (Fig. 5) in its downward position by the clamps 21 simultaneously with the clamping of the saddle, or immediately thereafter. This serves to clamp the outwardly extending marginal edges of the blank firmly against the base plate E and holds the plastic in intimate contact with the rounded end of the form A.

In operating the wiping section or member D the panel 19 may be held against the base plate E at the beginning of the wiping movement of the hinged plate 14 and we have found that satisfactory results may be thus obtained. However, this wiping action has also been performed by having the panel 19 spaced somewhat above the base plate E and simultaneously moving the panel 19 downwardly along its mounting pins 20 while swinging the plate 14 in an anti-clockwise direction. In either mode of procedure it has been found convenient to mount the hinges on a separate panel to permit disassembly. However, it is to be understood that the hinges 18 may be mounted directly on an integral part of the base plate E.

After the wiping member has been secured in clamped position the tuck-in member D is moved by actuation of the lever 29 into the position indicated in Fig. 8. This serves to exert pressure on the plastic adjacent the cut-out portion 2 in a direction generally parallel to the base plate E and to the initial position assumed by the blank at the beginning of the operation. The pressure thus exerted on the zone adjacent the cut-out portion 2 serves to sharply bend the material inwardly at the chin section and exerts a tension on a contiguous area of the plastic sheet.

After the formed blank has cooled the clamps are removed, the saddle B, wiping member C and tuck-in member D are withdrawn and the formed member is removed and is ready for trimming along the outline designated in general as P. In order to facilitate the removal of the face piece the positioning pins 3 may be slidably positioned in the form A with helical coil springs disposed between their lower end and bottom of the holes in which they are seated so as to permit the pins to be depressed below the level of the plastic.

From the foregoing it will be seen that the plastic blank S is initially bent or formed transversely in a generally uniform curve and that while the transverse curvature in the zone L1 is being continued the remainder of the blank is being progressively bent or formed from the zone L1 toward the smaller end of the form A and during such progressive formation the blank is being formed or bent toward a longitudinal axis and simultaneously it is being formed or bent transversely about said axis. This serves to gradually move or flow the excess material down into the marginal edge which is to be cut off and prevents wrinkles or undue distortion in the area of the piece to be formed.

Having thus described our invention with particularity with reference to the presently preferred apparatus and in connection with the preferred method, and having referred to certain modifications thereof, it will be obvious to those skilled in the art, after understanding our invention, that various other changes and modifications may be made therein without departing from the spirit and scope of the invention, and we aim in the appended claims to cover such changes and modifications as are within the scope of the invention.

What we claim is:

1. Apparatus for molding plastic hollow bodies from sheet blanks, comprising a male form provided adjacent one end with a portion of relatively uniform lateral curvature and tapering from said portion throughout a longitudinally and laterally curved portion corresponding to the body to be formed, the smaller end of said form being somewhat rounded in plan view, said form having a transversely extending base and being undercut to provide a relief zone below said tapered end, a female saddle form having a lateral curvature complementary to the curvature of said male form portion at its larger end, means for guiding said female form for registered movement relative to said male form, a wiping plate having a forward edge provided with a curved recess complementary to the smaller rounded end of said male form, said wiping plate being mounted for downward movement toward said male form and positioned so that when moved downwardly to its lower limit its curved recess will lie in spaced relation to said male die a distance substantially as great as the thickness of the sheet blank being operated upon, and a tuck-in plate mounted for movement toward the rounded end of said male form in substantial register with said relief zone and having a concave leading edge adapted to be moved into contiguity with the perimeter of said rounded end adjacent said relief zone.

2. Apparatus for molding plastic face pieces for a helmet from sheet blanks, comprising a male form provided with a convex surface having a lateral curvature and a longitudinal curvature and varying in cross-sectional area from a larger to a smaller size, the smaller end of said form being somewhat rounded in plan view, said form having a transversely extending base and being undercut at its smaller end adjacent said base, a female saddle form having a lateral curvature complementary to the curvature of said male form at its larger end for a length substantially less than the length of said male form, means mounting said female form for registered movement relative to said male form in a direction toward and away from said base, a wiping plate having a forward edge provided with a curved recess complementary to the smaller rounded end of said male form, said wiping plate being mounted for downward movement toward said male form and positioned so that when moved downwardly to its lower limit said forward edge will lie closely adjacent the rear face of said saddle form and its curved recess will lie in spaced relation to said male die a distance substantially as great as the thickness of the sheet blank being operated upon, and a tuck-in plate mounted for movement toward the rounded end of said male form in a direction in general alignment with said undercut portion and having a concave leading edge generally conforming to said rounded end of said male form and adapted to be moved into contiguity therewith.

3. Apparatus for molding plastic face pieces for a helmet from sheet blanks, comprising a laterally and longitudinally curved male form whose cross-sectional area varies longitudinally from a larger to a smaller size, the smaller end of said form being somewhat rounded in plan view, said form having a transversely extending base and being undercut at its smaller end adjacent said base, a female saddle form having a lateral curvature complementary to the curvature of said male form at its larger end for a length substantially less than the length of said male form, means mounting said female form for registered movement relative to the corresponding portion of said male form, a wiping plate having a forward edge provided with a curved recess complementary to the smaller rounded end of said male form, said wiping plate being hingedly mounted for downward swinging movement toward said male form and positioned so that when moved downwardly to its lower limit said curved recess will lie in spaced relation to the corresponding surface of said male die a distance substantially as great as the thickness of the sheet blank being operated upon, and a tuck-in plate mounted for longitudinal movement toward the rounded end of said male form and having a concave leading edge generally conforming to said rounded end and adapted to be moved toward said rounded end in a direction in general alignment with said undercut portion of said male form.

4. Apparatus for molding plastic face pieces for a helmet from sheet blanks, comprising a laterally and longitudinally curved male form whose cross-sectional area varies longitudinally from a larger to a smaller size, said form at its larger end being provided with a substantially cylindrical segment and being of a depth greater than the depth of the article to be formed, the smaller end of said form being somewhat rounded in plan view, said form having a transversely extending base and being undercut at its smaller end adjacent said base, a female saddle form complementary to said cylindrical segment, means mounting said female form for registered movement relative to the corresponding portion of said male form, a wiping plate having a forward edge provided with a curved recess complementary to the smaller rounded end of said male form, said wiping plate being mounted for downward movement toward said male form and positioned so that when moved downwardly to its lower limit said curved recess will lie in spaced relation to the corresponding surface of said male die a distance substantially as great as the thickness of the sheet blank being operated upon, and a tuck-in plate mounted for longitudinal movement toward the rounded end of said male form and having a concave leading edge generally conforming to said rounded end and adapted to be moved toward said rounded end in a direction in general alignment with said undercut portion of said male form.

5. Apparatus for molding plastic face pieces for a helmet from sheet blanks, comprising a laterally and longitudinally curved male form whose cross-sectional area varies longitudinally from a larger end to a smaller end, said form at its larger end being provided with a substantially cylindrical segment extending beyond the extremity of the article to be formed and being of a depth greater than the depth of the article to be formed, the smaller end of said form being somewhat rounded in plan view, said form having a transversely extending base at said larger end and being undercut at its smaller end to adjacent said base, a female saddle form complementary to said cylindrical segment, means mounting said female form for registered movement relative to the corresponding portion of said male form, a wiping plate having a forward edge provided with a curved recess complementary to the smaller rounded end of said male form, said wiping plate being mounted for downward movement toward said male form and positioned so that when moved downwardly to its lower limit said curved recess will lie in spaced relation to the corresponding surface of said male die a distance substantially as great as the thickness of the sheet blank being operated upon, and a tuck-in plate mounted for longitudinal movement toward the rounded end of said male form and having a concave leading edge generally conforming to said rounded end and adapted to be moved toward said rounded end in a direction in general alignment with said undercut portion of said male form.

6. Apparatus for molding plastic face pieces for a helmet from sheet blanks, comprising a male form provided with a convex surface having a lateral curvature throughout a longitudinal distance in which the cross-sectional area varies from a larger to a smaller size, the smaller end of said form being rounded in plan view, said form at its larger end having a transversely extending base secured to a supporting member and being undercut at its smaller end to provide a relief zone adjacent said supporting member, a female saddle form having a lateral curvature complementary to the curvature of said male form at its larger end disposed in vertical register with said base, vertical guide means mounting said female form for registered movement relative to said male form, a wiping plate having a forward edge provided with a curved recess complementary to the smaller rounded end of said male form, said wiping plate being mounted on said supporting member for downward swinging movement toward said male form and positioned so that when moved downwardly to its lower limit said forward edge will lie closely adjacent the rear face of said saddle form and its curved recess will lie in spaced relation to the rounded end of said male die a distance substantially as great as the thickness of the sheet blank being operated upon, a tuck-in plate having a concave leading edge complementary to the recess in said male form, an actuating lever pivotally mounted on said supporting member and operably engageable with the rear end of said tuck-in plate for urging the same toward the rounded end of said male form in a direction generally parallel to said supporting member and in general alignment with said relief zone.

7. The method of making a plastic face piece for a helmet which comprises heating a thermoplastic blank in an oil bath until soft enough to form, holding said blank against lateral and longitudinal movement relative to a longitudinal axis, partially bending portions of said blank on opposite sides of said axis simultaneously in a transverse direction about said axis into a generally uniform curvature, continuing the transverse bending of said blank into generally uniform curvature throughout an end zone extending a minor portion of its length and simultaneously therewith exerting a wiping pressure on the remaining length of said blank beyond said zone and thereby bending said remaining length in a transverse and longitudinal direction into a tapered curvature of gradually decreasing cross-sectional dimensions, holding said partially formed blank while restraining its curved surface interiorly throughout its tapered extent, and while so held and restrained exerting pressure on the peripheral edge portion of said partially formed blank at the end of said tapered curvature in a direction toward said end zone and generally parallel to said longitudinal axis to thereby form a rounded end.

8. The method of making a plastic face piece for a helmet which comprises heating a thermoplastic blank of a length and width greater than the corresponding surface dimensions of the face piece to be formed until soft enough to form, partially bending portions of said blank on opposite sides of said axis simultaneously throughout its entire length in a transverse direction about a longitudinal axis, continuing the transverse bending throughout a limited end zone disposed beyond the area of the face piece to be formed until said end zone conforms to a generally uniform curvature and during said continued bending in said end zone simultaneously bending without appreciable stretching the remainder of said blank longitudinally toward and in a transverse direction around said longitudinal axis to provide a rounded and gradually tapering curved surface corresponding to the major area of the face piece to be formed, securely holding said partially formed blank while restraining its curved surface interiorly throughout its tapered extent, and while so held and restrained exerting pressure on the peripheral edge portion of said partially formed blank at the end of said tapered curvature in a direction toward said end zone and generally parallel to said longitudinal axis to thereby form a rounded end.

9. Method of making a hollow plastic body generally tapered in side elevation and plan view which comprises heating a thermoplastic blank until soft enough to form, placing the softened blank over a male form having the desired contour of the finished article, bending respectively oppositely extending side portions of said blank simultaneously over said male form in a transverse direction until said blank lies closely against said form throughout an end zone extending for a minor portion of its length, after said blank has been only partially bent and concurrently with the further formation of said end zone progressively forming without appreciable stretching the major portion of said blank in a transverse and longitudinal direction against said male form, holding said partially formed blank firmly against said form, and while so held exerting pressure on the marginal lower portion of said partially formed blank in a direction generally parallel to the blank position before the first bending operation.

10. Method of making a hollow plastic face piece having a double curvature and being of generally semi-elliptical outline which comprises heating a thermoplastic blank in an oil bath until soft enough to form, placing the softened blank coated with oil over a male form having the desired contour of the finished article and having an extended end zone of generally semi-cylindrical shape, bending respectively oppositely extending side portions of said blank simultaneously over said male form in a transverse direction until said blank lies closely adjacent said form throughout said end zone, after said bending has been only partially performed and concurrently with its completion progressively forming without appreciable stretching the area of said blank corresponding to said desired contour in a transverse and simultaneously in a longitudinal direction against said male form, holding said partially formed blank firmly against said form, and while so held exerting pressure on the marginal lower portion of said partially formed blank in a direction generally parallel to the blank position before the first bending operation to thereby urge the same closely against the end of said form.

References Cited in the file of this patent

UNITED STATES PATENTS

| | | |
|---|---|---|
| 1,880,920 | Eddins et al. | Oct. 4, 1932 |
| 2,251,477 | Wisman | Aug. 5, 1941 |